(12) United States Patent
Mitra et al.

(10) Patent No.: US 10,828,606 B2
(45) Date of Patent: Nov. 10, 2020

(54) RADIATIVE TREATMENT OF LIQUIDS IN DESALINATION AND OTHER MEMBRANE PROCESSES

(71) Applicant: NEW JERSEY INSTITUTE OF TECHNOLOGY, Newark, NJ (US)

(72) Inventors: Somenath Mitra, Bridgewater, NJ (US); Sagar Roy, Newark, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 98 days.

(21) Appl. No.: 16/031,651

(22) Filed: Jul. 10, 2018

(65) Prior Publication Data

US 2019/0118143 A1 Apr. 25, 2019

Related U.S. Application Data

(60) Provisional application No. 62/576,857, filed on Oct. 25, 2017.

(51) Int. Cl.
*B01D 61/36* (2006.01)

(52) U.S. Cl.
CPC ......... *B01D 61/364* (2013.01); *B01D 61/366* (2013.01); *B01D 2311/04* (2013.01); *B01D 2311/103* (2013.01); *B01D 2311/13* (2013.01); *B01D 2311/2607* (2013.01); *B01D 2311/2615* (2013.01); *B01D 2313/22* (2013.01); *B01D 2313/365* (2013.01)

(58) Field of Classification Search
CPC ............................ B01D 61/364; B01D 61/366
See application file for complete search history.

(56) References Cited

U.S. PATENT DOCUMENTS

| | | | | |
|---|---|---|---|---|
| 5,290,403 A | * | 3/1994 | Saask | B01D 3/346 159/DIG. 27 |
| 2012/0228225 A1 | * | 9/2012 | Casara | B01D 61/364 210/640 |
| 2015/0009693 A1 | | 1/2015 | Sekiguchi et al. | |
| 2017/0333848 A1 | | 11/2017 | Mitra | |
| 2019/0358352 A1 | * | 11/2019 | Qamar | B08B 3/102 |

OTHER PUBLICATIONS

H.J. Hwang, K. He, S. Gray, J.H. Zhang, I.S. Moon, Direct contact membrane distillation (DCMD): experimental study on the commercial PTFE membrane and modeling, J.Membr.Sci. 371, 90-98 (2011).

J. Phattaranawik, R. Jiraratananon, A.G. Fane, C. Halim, Mass flux enhancement using spacer filled channels in direct contact membrane distillation, J. Membr. Sci. 187, 193-201 (2001).

(Continued)

*Primary Examiner* — Krishnan S Menon
(74) *Attorney, Agent, or Firm* — Servilla Whitney LLC

(57) ABSTRACT

Radiative heating and radiative feed modification systems and methods using microwave, radio frequency, magnetic field and ultrasound in membrane separation processes including membrane distillation (MD), reverse osmosis, forward osmosis and pervaporation are disclosed. Membrane distillation systems include at least one MD module, the MD module having at least one membrane, a feed inlet operable to receive a feed media and a feed outlet, and a radiative energy source operable to apply radiation to a feed media entering the feed inlet.

9 Claims, 7 Drawing Sheets

(56) References Cited

OTHER PUBLICATIONS

M.M. Teoh, S. Bonyadi, T.-S. Chung, Investigation of different hollow fiber module designs for flux enhancement in the membrane distillation process, J. Membr. Sci. 311, 371-379 (2008).

C. Zhu, G.L. Liu, Modeling of ultrasonic enhancement on membrane distillation, J. Membr. Sci. 176, 31-41 (2000).

D. Hou, Z. Wang, G. Li, H. Fan, J. Wang, H. Huang, Ultrasonic assisted direct contact membrane distillation hybrid process for membrane scaling mitigation, Desalination 375, 33-39 (2015).

J. Wang, X. Sun, Y. Yuan, H. Chen, H. Wang, D. Hou, A novel microwave assisted photocatalytic membrane distillation process for treating the organic wastewater containing inorganic ions, J. Water Process Eng'g. 9, 1-8 (2016).

R.N. Gedye, W. Rank, K.C. Westaway, The rapid synthesis of organic-compounds in microwave-ovens. 2, Can. J. Chem Rev. Can. Chim. 69, 706-711 (1991).

Y. Wang, Z. Iqbal, S. Mitra, Microwave-induced rapid chemical functionalization of singlewalled carbon nanotubes, Carbon 43, 1015-1020 (2005).

J. Hong, N. Ta, S.G. Yang, Y.Z. Liu, C. Sun, Microwave-assisted direct photolysis of bromophenol blue using electrodeless discharge lamps, Desalination 214 (2007) 62-69.

Y. Nakai, H. Yoshimizu, Y. Tsujita, Enhanced gas permeability of cellulose acetate membranes under microwave irradiation, J. Membr. Sci. 256, 72-77 (2005).

S.M. Ibrahim, H. Nagasawa, M. Kanezashi, T. Tsuru, Robust organosilica membranes for high temperature reverse osmosis (RO) application: Membrane preparation, separation characteristics of solutes and membrane regeneration, J. Membr. Sci. 493, 515-523 (2015).

R. Kreiter, D.P. Wolfs, C.W.R. Engelen, H.M. van Veen, J.F. Vente, High-temperature pervaporation performance of ceramic-supported polyimide membranes in the dehydration of alcohols. J. Membr. Sci. 319, 126-132 (2008).

A.H. Hawari, N. Kamala, A. Altaee, Combined influence of temperature and flow rate of feeds on the performance of forward osmosis. Desalination 398, 98-105 (2016).

W. Puthai, M. Kanezashi, H. Nagasawa, T. Tsuru, Nanofiltration performance of $SiO_2$—$ZrO_2$ membranes in aqueous solutions at high temperatures. Sep. and Purif. Technol 168, 238-247 (2016).

E.S. Kryachko, Ab initio studies of the conformations of water hexamer: modelling the penta-coordinated hydrogen-bonded pattern in liquid water, Chem. Phys. Lett. 314, 353-363 (1999).

M. L. Rao, S. R. Sedlmayr, R. Roy and J. Kanzius, Polarized microwave and RF radiation effects on the structure and stability of liquid water, Curr. Sci. 98 (11) 1-6 (2010).

M. Tanaka and M. Sato, Microwave heating of water, ice, and saline solution: Molecular dynamics study, J. Chem. Phys. 126, 034509, 1-9 (2007).

* cited by examiner

RADIATIVE TREATMENT OF LIQUIDS IN DESALINATION AND OTHER MEMBRANE PROCESSES

CROSS-REFERENCE TO RELATED APPLICATIONS

This application claims the benefit of U.S. Provisional Patent Application No. 62/576,857 filed Oct. 25, 2017, the entirety of which is incorporated herein by reference.

FIELD OF THE INVENTION

The present disclosure relates in general to radiative treatment and radiative feed modification using microwave, radio frequency (RF), magnetic field and/or ultrasound modification, and specifically, to radiative treatment and feed modification systems and methods for membrane separation processes such as membrane distillation, reverse osmosis, forward osmosis, and pervaporation.

BACKGROUND

Desalination involves the production of fresh water from saline water. With increasing demand for fresh water, sea water desalination technology has been developing quickly in the past decades. Low energy consumption makes membrane based techniques such as reverse osmosis (RO), forward osmosis (FO) and membrane distillation (MD) attractive options. MD is an evaporation technique in which the driving force is the temperature-induced vapor pressure gradient caused by having a hot feed and a cold permeate separated by a membrane. Typically, MD is carried out at 60-90° C., which is a significantly lower temperature than that used in conventional distillation. Therefore, it can generate high quality drinking water using low temperature heat sources such as waste heat from industrial processes and solar energy.

Although MD is believed to be a promising technology for desalination of brackish and sea water, its application on a large industrial scale is impeded by factors such as low water vapor flux and relatively high energy consumption compared to reverse osmosis. Accordingly, there is a need in desalination techniques, such as in the membrane distillation field, to enhance water vapor flux and cost efficiencies.

SUMMARY OF THE INVENTION

Maximizing solute rejection and flux would contribute to making MD commercially viable. Since the membrane itself determines both flux and selectivity, efforts have been made to develop novel membranes and processes. However, these efforts have not resulted in cost efficiencies and/or may result in damage to membranes. For example, since it is well known that temperature and concentration polarization along with the channeling effect influence the membrane flux, efforts have been made at providing turbulence-inducing components such as spacers and baffles to fill in the flow channels of membrane modules, which could eventually enhance the mixing of solutions, thus reducing the temperature polarization and concentration polarization. See, H. J. Hwang, et al., Direct contact membrane distillation (DCMD): experimental study on the commercial PTFE membrane and modeling, J. Membr. Sci., 371 (2011) 90-98; J. Phattaranawik, et al., Mass flux enhancement using spacer filled channels in direct contact membrane distillation, J. Membr. Sci. 187 (2001) 193-201; M. M. Teoh, et al., Investigation of different hollow fiber module designs for flux enhancement in the membrane distillation process, J. Membr. Sci. 311 (2008) 371-379. However, these turbulence-inducing components may increase the power consumption greatly and the grids may cause damage on the membrane surface.

An ultrasonic technique combined with MD for enhanced performance has been proposed. See, C. Zhu and G. L. Liu, Modeling of ultrasonic enhancement on membrane distillation, J. Membr. Sci. 176 (2000) 31-41. An ultrasonic assisted direct contact membrane distillation hybrid process has been reported. See, D. Hou et al., Ultrasonic assisted direct contact membrane distillation hybrid process for membrane scaling mitigation, Desalination 375 (2015) 33-39; J. Wang et al., A novel microwave assisted photo-catalytic membrane distillation process for treating the organic wastewater containing inorganic ions, J. Water Process Eng'g., 9 (2016) 1-8. However, while the hybrid process modified the liquid-membrane interface and there was reduction in $CaSO_4$ fouling, the ultrasound caused damage to the membrane structure itself.

Microwave energy has been used as a heating source in many industrial processes such as chemical synthesis and is extensively used in cooking. Dipoles are formed when a dielectric material is placed in a microwave field. A dipole orientation polarization develops in an alternating electric field generated by microwave and the direction of these dipoles changes at high frequency. Because the time required for dipole orientation lags behind the electric field, it produces the dielectric loss and generates heat. For a particular system, the amount of dielectric loss depends on the microwave frequency, temperature, and ion concentration of solution. A microwave frequency of 2.45 GHz leads to the maximum dielectric loss for water.

It has been observed that membrane performance in various separation and purification processes, including nanofiltration, reverse osmosis, pervaporation, etc., strongly depend on the temperature of the system. A slight increase in temperature enhanced the overall permeability. See, S. M. Ibrahim et al., Robust organosilica membranes for high temperature reverse osmosis (RO) application: Membrane preparation, separation characteristics of solutes and membrane regeneration, J. Membr. Sci. 493 (2015) 515-523; R. Kreiter et al., High-temperature pervaporation performance of ceramic-supported polyimide membranes in the dehydration of alcohols, J. Membr. Sci. 319 (2008) 126-132; A. H. Hawaria et al., Combined influence of temperature and flow rate of feeds on the performance of forward osmosis, Desalination, 398 (2016) 98-105; W. Puthai et al., Nanofiltration performance of SiO2-ZrO2 membranes in aqueous solutions at high temperatures, Sep. and Purif. Technol, 168 (2016) 238-247.

Microwave-assisted processes including organic synthesis have been investigated and the presence of thermal as well as non-thermal effects have been suggested. R. N. Gedye et al., The rapid synthesis of organic compounds in microwave ovens, 2 Can. J. Chem. Rev. Can. Chim. 69 (1991) 706-711. Microwave-induced reactions including functionalization of nanocarbons and nanoparticle synthesis and their effectiveness and advantages over conventional heating techniques have also been demonstrated. Y. Wang et al., Microwave-induced rapid chemical functionalization of single-walled carbon nanotubes, Carbon 43 (2005) 1015-1020. In addition, microwave has been widely utilized in several chemical reaction processes, such as photo-catalytic processes, because of its low cost, simple equipment, and high efficiency. J. Hong et al., Microwave-assisted direct photolysis of bromophenol blue using electrodeless discharge lamps, Desalination 214 (2007) 62-69. In the area of membrane separations, microwave has been used during gas separation through a cellulose acetate (CA) membrane. Y. Nakai et al., Enhanced gas permeability of cellulose acetate membranes under microwave irradiation, J. Membr. Sci. 256 (2005) 72-77. The results revealed that microwave irradiation could successfully enhance the gas and vapor transfer processes in membrane pores.

In accordance with embodiments of the present disclosure, exemplary embodiments are generally directed to microwave treatment of feed streams for membrane distillation (MD) systems and processes with particular emphasis on desalination and pervaporation. However, other forms of radiation such as radio frequency, ultrasound and magnetic field radiation may be employed. In addition, other membrane separation systems may be employed including but not limited to reverse osmosis, forward osmosis, and pervaporation.

In one embodiment, a microwave irradiation process is employed to enhance pure water generation rate in an MD system. Beside thermal heating effect, non-thermal microwave effects also play an important role in enhancing the MD performance. The effect of microwave strengthening on water vapor flux under various feed temperatures, flow rates, and concentrations was evaluated. MD performance enhancement was observed at a lower temperature and flow rate. The membranes showed stability over a longer period of time without any fouling and breaking under microwave environment. These results indicate coupling of microwave techniques as disclosed herein provide an alternative to thermal heating of feed solution with enhanced flux. The data also suggest that homogeneous heating within a large volume module in a large scale system may be attained via microwave irradiation.

In accordance with one or more embodiments, an MD system includes at least one MD module, the MD module having at least one membrane, a feed inlet operable to receive a feed media and a feed outlet, and a radiative energy source operable to apply radiative energy to a feed media entering the feed inlet. The radiative energy source may be a microwave, radio frequency, magnetic field or ultrasound generator. The radiative energy source may be a chamber with the at least one MD module positioned in the chamber. In certain embodiments the at least one MD module is positioned in a central location of the chamber to ensure equal absorption of radiative energy from all directions.

The at least one MD module may be a hollow fiber membrane module, a flat membrane module or a spiral wound membrane module. The MD module may be a direct contact membrane distillation (DCMD) module, a sweep gas membrane distillation (SGMD) module, a vacuum membrane distillation (VMD) module or an air gap membrane distillation (AGMD) module. The membrane of the MD module may be a polymeric, ceramic, hydrophilic, hydrophobic, mixed matrix, porous, nonporous or composite membrane.

In one or more embodiments the MD system includes a temperature controlled bath coupled to the at least one MD module. The MD system may be a desalination system.

In accordance with further embodiment, methods for purifying a feed stream are disclosed which include the steps of providing at least one membrane separation device having a feed inlet and feed outlet, subjecting the feed stream to radiation selected from the group consisting of microwave, RF, magnetic field and ultrasound radiation prior to or upon introduction of the feed stream to the at least one membrane separation device, introducing the feed stream to the at least one membrane separation device, and recovering a stream from the feed outlet of the at least one membrane separation device.

The membrane separation device may be a polymeric, ceramic, hydrophilic, hydrophobic, mixed matrix, porous, nonporous or composite membrane. The method may be an MD process, a reverse osmosis process, a forward osmosis process or pervaporation process. In some embodiments the method is an MD process employing an MD module as the membrane separation device.

The method may further include heating the feed stream, such as but not limited to heating in a temperature controlled bath, prior to introducing the feed stream to the MD module. All or a fraction of the recovered stream may be introduced to the temperature controlled bath. The method may include introducing make up water to the temperature controlled bath. The method may be employed in desalination and may be used to treat a feed stream of or including seawater.

The implementation of microwave or radio frequency as an alternative to conventional heating systems may improve membrane separation performance significantly by not only providing heat but modifying the chemical nature of the feed such as breaking up salt-water clusters. The latter may also be accomplished via the use of a magnetic field or ultrasound.

Any combination and/or permutation of the embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

For the purposes of illustration, there are forms shown in the drawings that are presently preferred, it being understood, however, that the invention is not limited to the precise arrangements and instrumentalities shown. To assist those of skill in the art in making and using the disclosed microwave induced membrane distillation system and process, reference is made to the accompanying figures, wherein.

DETAILED DESCRIPTION

Figure 1:
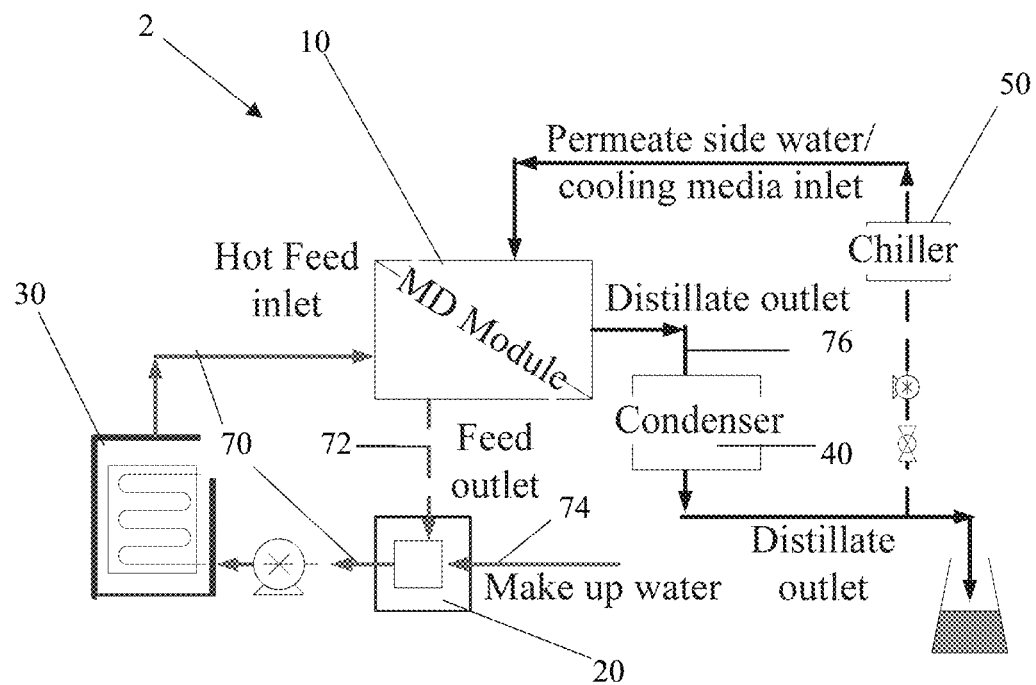
FIG. 1 is a schematic depiction of a microwave induced membrane distillation system in accordance with one or more embodiments of the present disclosure.

The present invention now will be described more fully hereinafter with reference to the accompanying drawings, in which illustrative embodiments of the invention are shown. In the drawings, the relative sizes of regions or features may be exaggerated for clarity. The invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Now referring to FIG. 1, a microwave induced membrane distillation (MIMD) system 2 includes a membrane distillation (MD) module 10, a temperature controlled bath 20, a radiative energy source 30 such as a microwave, RF, magnetic field or ultrasound generator, chamber or the like, a condenser 40, and a chiller 50. Feed stream 70 is subjected to radiation by radiative energy source 30. The feed stream 70 may be heated to a predetermined temperature by virtue of being subjected to the radiation. For example and not by way of limitation, the feed stream 70 may be circulated through tubing that runs through the path of radiation generated by the radiative energy source 30, resulting in heating as well as modifying the chemical nature of the feed stream 70. In one embodiment the radiative energy source 30 is a microwave generator. In other embodiments the radiative energy source 30 is an RF, magnetic field or ultrasound generator.

Feed stream 70 is subsequently introduced to membrane distillation (MD) module 10. Stream 72 exits MD module 10 and may be introduced to a temperature controlled bath 20 to be recirculated as feed stream 70. Make up water stream 74 may be introduced to or subjected to heating by heating device 20 to maintain a desired feed concentration of feed stream 70. In this configuration, the radiative energy source 30 is located external to the membrane module 10. Tubing or other conduit as is well known in the art couples the elements of the system 2 to conduct streams 70 and 72 through the system. Cold distillate or condensing media streams are circulated through the MD module 10 as is well known in the art. Distillate 76 exiting the MD module 10 may be condensed using condenser 40 and recovered and a fraction recirculated to a chiller 50 to be employed as permeate side fluid and introduced into the MD module as a cooling media.

Figure 2:
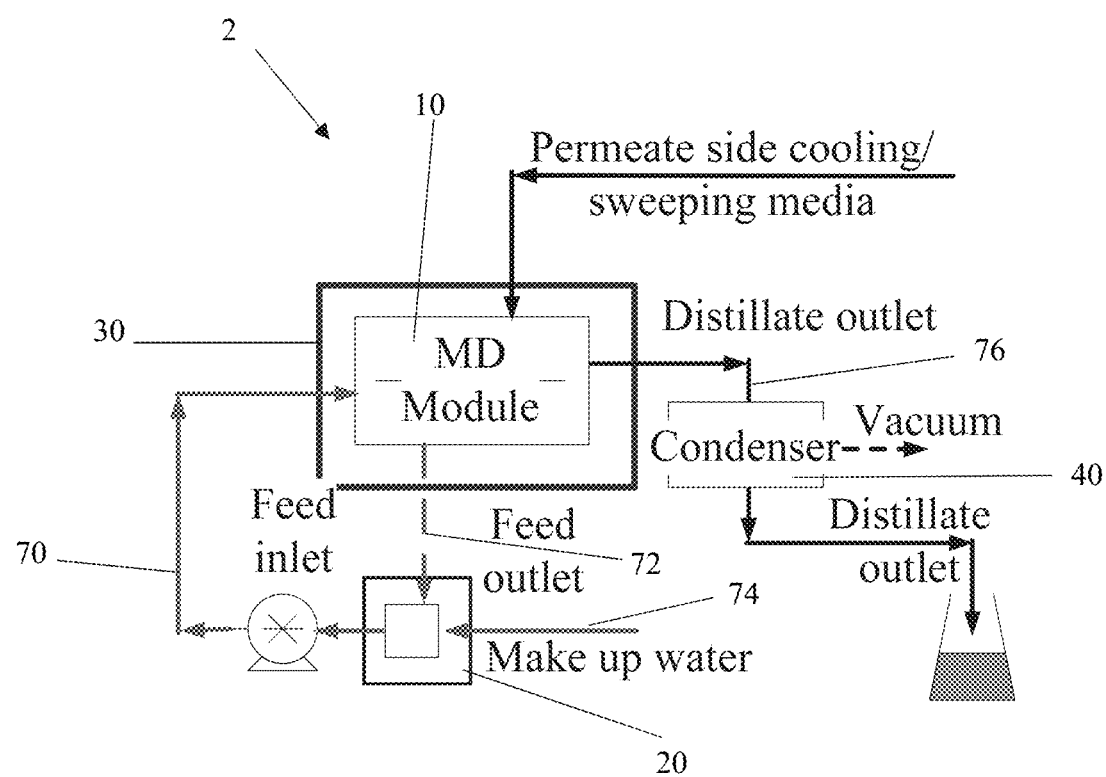
FIG. 2 is schematic depiction of a microwave induced membrane distillation system in accordance with one or more embodiments of the present disclosure.

Now referring to FIG. 2, in an alternate embodiment, the radiative energy source 30 is a chamber and an MD module 10 is positioned in the chamber. Feed stream 70 is fed to MD module 10 and subjected to radiative energy. Feed stream 72 exits the MD module 10. In one or more embodiments the MD module 10 is positioned in a central position of the chamber to ensure equal absorption of radiative energy from all directions. This arrangement is beneficial for SGMD and VMD configurations. It will be understood that the location of the radiative energy source 30 containing the MD module 10 may be varied to be located anywhere in line with the feed stream 70. In one embodiment the radiative energy source 30 is a microwave chamber. In other embodiments the radiative energy source 30 is a chamber in which the MD module 10 is contained and RF, magnetic field or ultrasound waves are applied to the MD module. Distillate 76 exiting the MD module 10 may be condensed using condenser 40 and recovered. While not shown those skilled in the art will recognize a fraction of distillate 76 may be recirculated to a chiller as shown in FIG. 1 to be employed as permeate side fluid and introduced into the MD module as a cooling media.

The foregoing systems may employed in any or all types of MD configurations, namely, direct contract (DCMD), sweep gas (SGMD), air gap (AGMD), and vacuum (VMD) membrane distillation.

In one or more embodiments MD systems disclosed herein the MD module 10 may be selected from a hollow fiber membrane module, a flat membrane module and a spiral wound membrane module. Hollow fiber membranes may be formed of any suitable material such as but not limited to polypropylene. Suitable hollow fiber membrane modules are commercially available from Applied Membrane Technology (AMT), Hopkins, Minn. and Eclipse Membrane, Plymouth Meeting, Pa. Flat membranes may be formed of any suitable material such as but not limited to PTFE or polypropylene. Suitable flat membrane modules are commercially available from Memsys GmbH, Schwabmünchen, Germany. Suitable spiral wound membrane modules may be formed of any suitable material such as but not limited to polypropylene and are commercially available from SolarSpring GmbH, Freiburg, Germany.

The MD module 10 may be any suitable MD module, such as but not limited to a direct contact membrane distillation (DCMD) module, sweep gas membrane distillation (SGMD) module, vacuum membrane distillation (VMD) module and/or air gap membrane distillation (AGMD) module.

It will be apparent to those skilled in the art that feed media passages and condensing media passages of MD membrane module 10 may be used interchangeably in at least some applications and/or embodiments disclosed herein.

Experiments and Materials

Materials and methods of the present disclosure used in the foregoing embodiments are described below. While the embodiments discuss the use of specific devices and materials, it is understood that the present disclosure could employ other suitable devices and materials. Similar quantities or measurements may be substituted without altering the method embodied below.

Experiments were conducted using MD systems of FIGS. 1 and 2 in which were employed Viton O-rings, PTFE tubing, perfluoroalkoxy (PFA) and PTFE connectors, feed and permeate flow pumps (Cole Parmer, Vernon Hills, Ill.), circulating heated temperature bath (Neslab GP-200, available from Cambridge Scientific, Watertown, Mass.), and circulating chiller (MGW Lauda RM6). Flat membranes were polytetrafluoroethylene (PTFE) membranes having an effective membrane area of 14.5 $cm^2$. Hollow fiber membrane modules for MD were constructed in a shell and tube format using ¼ in. PTFE tubing. Ten 16.6 cm long hollow fiber strands were used in the module. Each module contained approximately 12.50 $cm^2$ of effective membrane contact area based on internal surface. The ends were then sealed with epoxy to prevent leakage into the shell side.

Sodium chloride (NaCl) was obtained from Sigma-Aldrich (St. Louis, Mo.) and deionized water (Barnstead 5023, Dubuque, Iowa) was used in all experiments. Flat polypropylene (Celgard, LLC, Charlotte, N.C.), polytetrafluoroethylene composite membranes with nonwoven polypropylene support (Advantec MFS, Inc.; Dublin, Calif.) membrane, and Celgard type X30-240 (Celgard, LLC, and Charlotte, N.C., USA) hollow fiber membranes were used in these MD experiments. A direct contact MD test cell was fabricated from polytetrafluoroethylene (PTFE) material due to its high temperature stability. The details of the membranes are given in Table 1.

TABLE 1

Specification of the membranes

| Membrane | Thickness/diameter (micron) | Pore size (micron) | Porosity (%) |
|---|---|---|---|
| Polypropylene Flat membrane | 35 | 0.045 | 68 |
| Polytetrafluoroethylene Flat membrane | 35 | 0.2 | 70 |
| Polypropylene Hollow fiber | 28 ID: 240 OD: 300 | 0.04 | 40 |

Hot aqueous sodium chloride (NaCl) solution of various concentrations was circulated on one side of the membrane in the MD cell. The temperature of the feed brine was maintained by using a temperature regulated hot oil bath for regular heating and a microwave (Oster, OGZF1301) for microwave-induced treatment. Cold distilled water (DCMD mode) or sweep air (sweep gas MD mode) was circulated on the other side of the membrane. Inlet and outlet temperatures of feed and permeate side were monitored by using a K-type temperature probe (Cole-Parmer). Makeup water was added continuously to the feed side to maintain constant concentration throughout the experiments. The concentrations of the feed brine and permeate were measured using a conductivity meter (Jenway, 4310). Each experiment was repeated at least three times to ensure reproducibility, and relative standard deviation was found to be less than 1%.

Figure 4A:
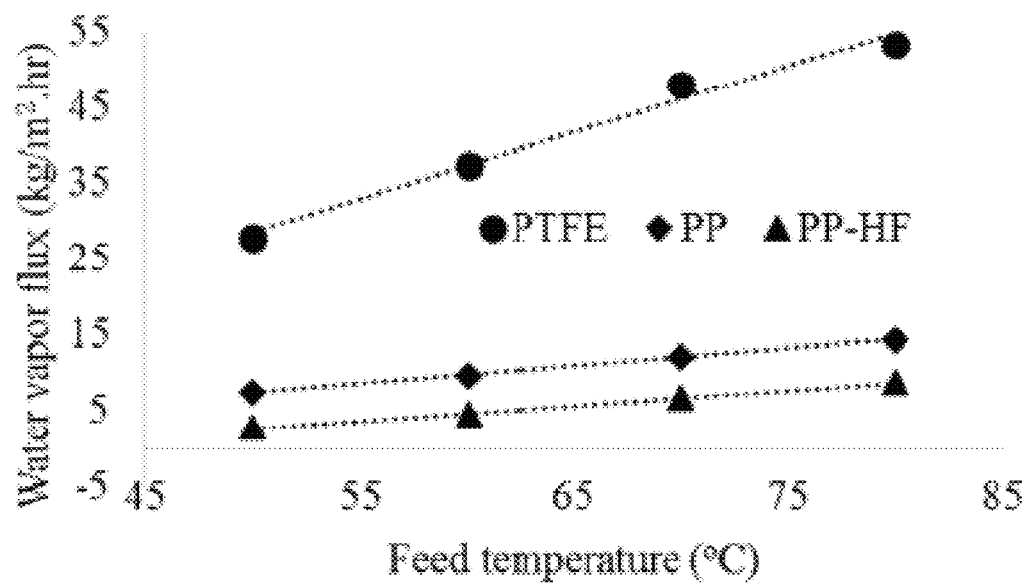
FIG. 4A is a graphical depiction of the influence of temperature on water vapor flux of various membranes with conventional heating.
Figure 4B:
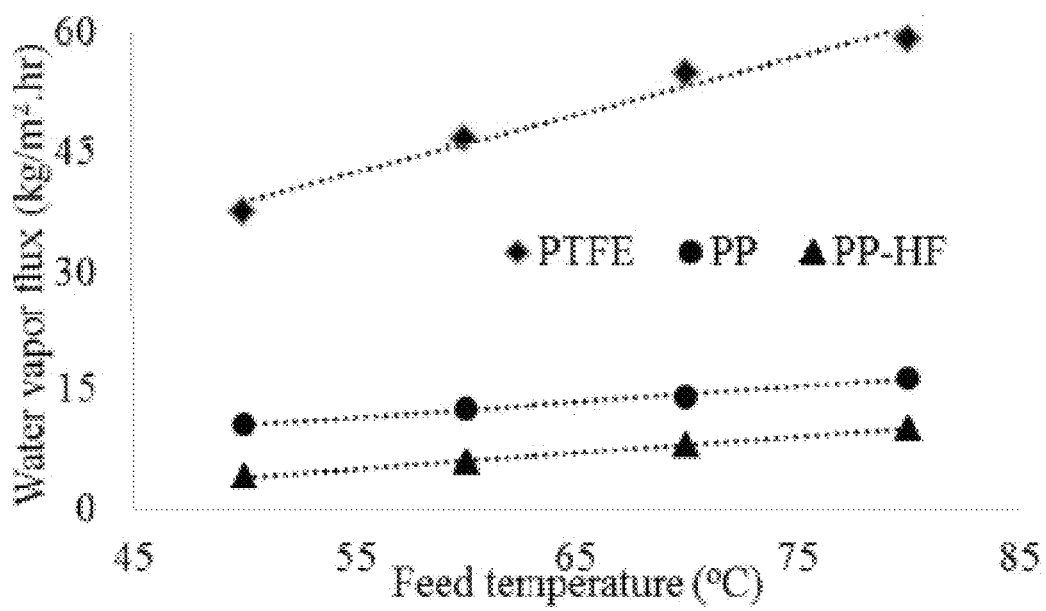
FIG. 4B is a graphical depiction of the influence of temperature on water vapor flux of the various membranes of FIG. 4A with microwave treatment in accordance with one or more embodiments of the present disclosure.

Now referring to FIGS. 4A and 4B, which show the influence of temperature on water vapor flux of the various membranes with conventional (FIG. 4A) and microwave induced (FIG. B) MD, it was observed that the permeate flux in all the membranes increased with temperature. The temperature increased the vapor pressure difference between feed and permeate side, hence the driving force for mass transport. In FIG. 4B, all of the membranes exhibited higher water vapor flux in microwave induced MD. For example, at 50° C. and 40 mL/min flow rate, the water vapor flux was as high as 37.5, 10.7 and 4.2 $kg/m^2 \cdot h$ for PTFE, PP, and PP-HF membranes, respectively. The water vapor flux was 35, 43, and 51% higher for PTFE, PP, and PP-HF membranes, respectively, compared to the water vapor flux for conventional MD. See, e.g. U.S. Patent App. No. 2015/0096935A1.

Figure 3:
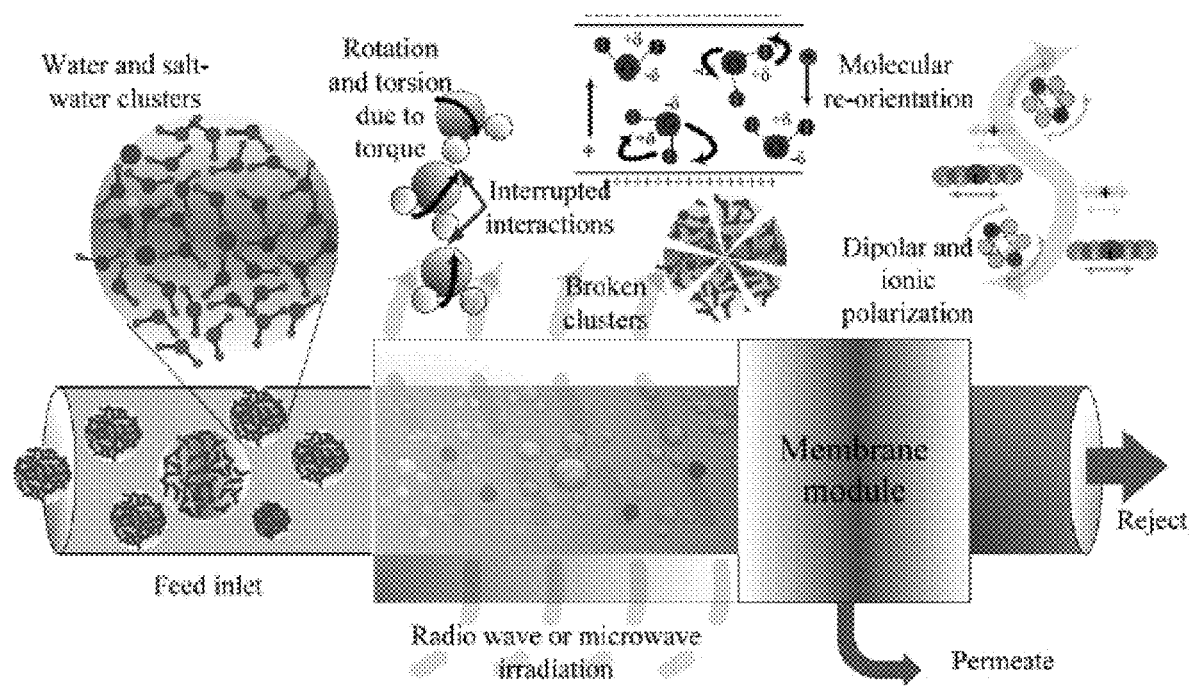
FIG. 3 is an illustrative depiction of the mechanism of radiation enhanced desalination and other membrane processes.

The enhancement in flux can be attributed to several facts. The proposed mechanism for enhanced water permeability in radiation induced desalination process is shown in FIG. 3. It is well established that the presence of hydrogen bonds in liquid water molecules facilitates the formation of molecule clusters of $(H_2O)_n$. E. S. Kryachko, Ab initio studies of the conformations of water hexamer: modelling the penta-co-ordinated hydrogen-bonded pattern in liquid water, Chem. Phys. Lett. 314 (1999) 353-363. The Raman spectra of microwave treated water showed a stable change (for at least 7 hours) in O—H stretch bond significantly compared to the untreated water. See, M. L. Rao, et al., Polarized microwave and RF radiation effects on the structure and stability of liquid water, Curr. Sci. 98 (2010) 5. The influence of an external electric field showed that it could destroy H-bonds, and changed the cluster structures. In the presence of salts, the ions are incorporated into the hydrogen bonded structure to form a salt-water cluster. The cluster structure disintegrates to individual molecules under MF and RF radiations which facilitates desalination in MD, RO and FO. During the evaporation in MD, the disintegrated water molecules evaporate rapidly to form water molecules that permeate through the membrane. Under microwave irradiation in MD, the water was not only heated up quickly and energy-efficiently, but also the molecular clusters were destroyed, which enhanced the escaping tendency of water molecules from the bulk solution. M. L. Rao et al., Polarized microwave and RF radiation effects on the structure and stability of liquid water, Curr. Sci. 98 (2010) 5.

It is also expected that polar molecules, like water, move more quickly after absorbing microwave energy. The same is expected in case of pervaporation where organic molecule-water clusters will be broken up to facilitate the removal of organic solvents and pollutants. Similar effects are expected from the use of a magnetic field as well.

Figure 4C:
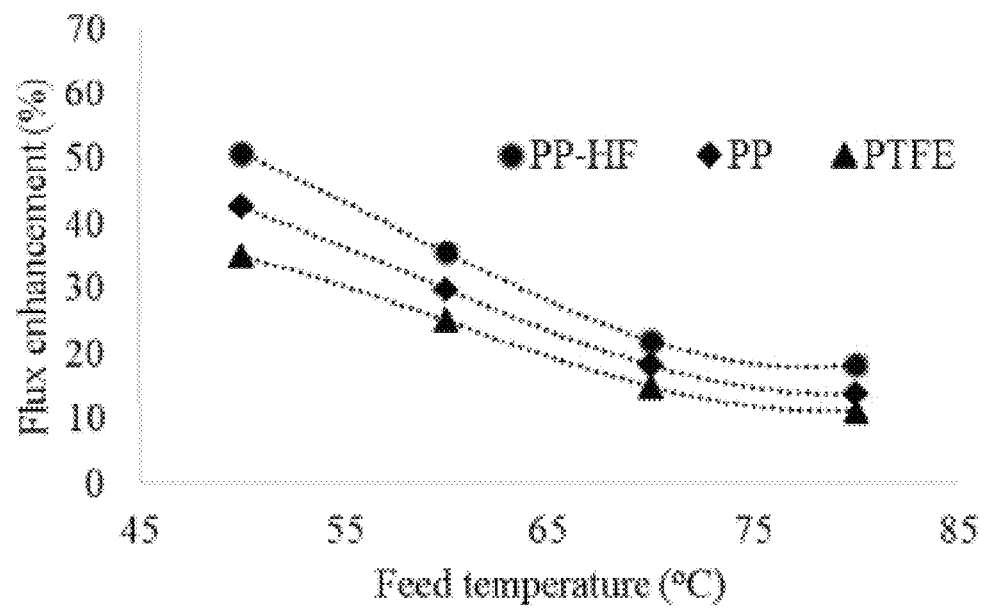
FIG. 4C is a graphical depiction of flux enhancement as a function of feed temperature for the various membranes of FIG. 4A with microwave treatment in accordance with one or more embodiments of the present disclosure.

The influence of microwave irradiation at various feed temperature is shown in the chart of FIG. 4C. It was observed that the percent enhancement decreased at higher temperatures. For example, at feed temperature 50° C., the enhancement for PP-HF was found to be 51%. However, at 80° C., the enhancement for PP-HF decreases to 18%. Without being confined to a single theory, it is believed this is possibly because of the weakening of water polarity and decrease in dielectric constant at relatively higher temperatures. At lower temperatures, water molecules absorb more microwave energy with pronounced effect.

Figure 5A:
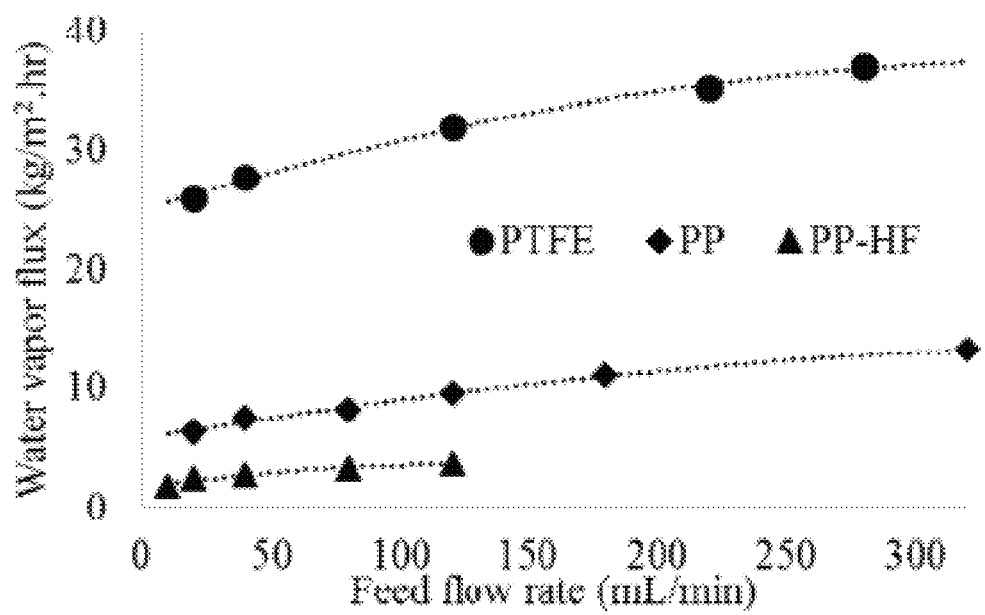
FIG. 5A is a graphical depiction of the influence of feed flow rate on water vapor flux of various membranes with conventional heating.
Figure 5B:
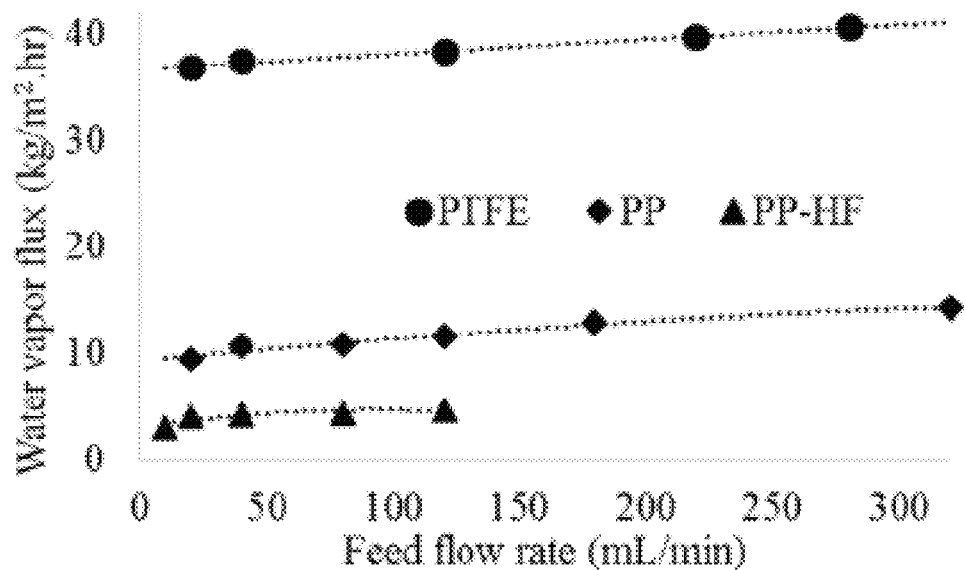
FIG. 5B is a graphical depiction of the influence of feed flow rate on water vapor flux of various membranes of FIG. 5A with microwave treatment in accordance with one or more embodiments of the present disclosure.

Now referring to FIGS. 5A and 5B, which show the influence of feed flow rate on water vapor flux of the various membranes with conventional (FIG. 5A) and microwave induced MD, it was observed that water vapor flux for microwave induced MD is higher than that of the conventional MD flux at the same feed flow rate. The feed flow rate during the experiments was varied between 10 and 320 mL/min. Permeate flow rate was maintained constant around 250 mL/min for all the experiments. FIG. 5A clearly demonstrates the increase in water vapor flux with increase in feed velocity. The elevated flow rates increased turbulence and reduced the boundary layer which helped in lowering the temperature polarization and increased the driving force for MD. It can be seen from FIG. 5B that the water vapor flux for microwave induced membrane distillation is higher than that of the conventional MD flux at the same feed flow rate.

Figure 5C:
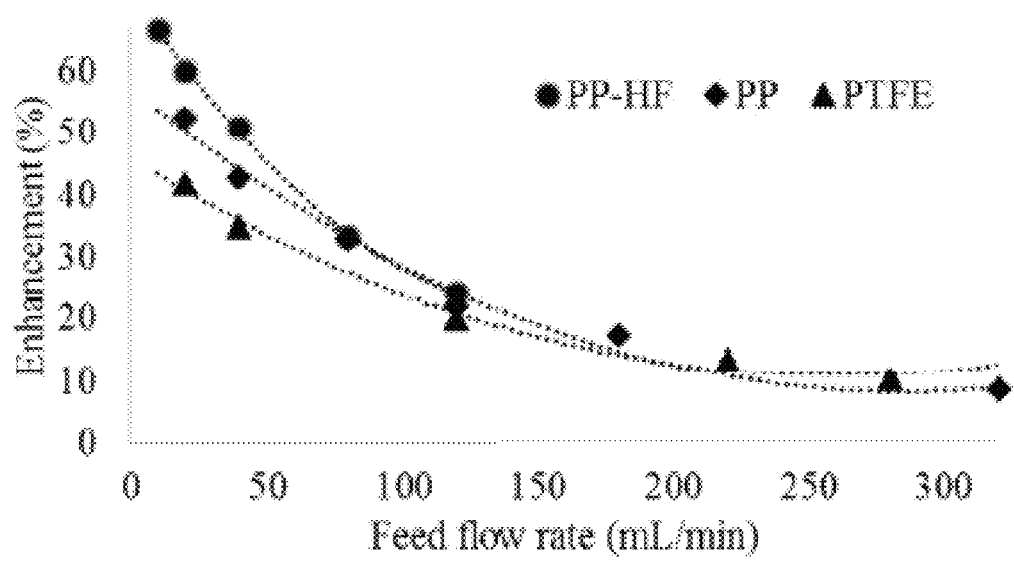
FIG. 5C is a graphical depiction of enhancement of water vapor flux as a function of feed flow rate due to microwave escalation in various membranes in accordance with one or more embodiments of the present disclosure.

Now referring to FIG. 5C, the percent enhancement of water vapor flux due to microwave escalation is shown. The feed flow rate influences the residence time of feed mixtures in the microwave chamber, which determines the microwave energy absorption. As shown in FIG. 5C, microwave irradiation influenced the water vapor flux at very low flow rates. However, the flux curve and percent enhancement become flatter indicating less influence at higher flow rates. For example, at a lower feed flow rate (20 mL/min, 50° C.), the flux enhancement was observed as 42% for the PTFE membrane, which reduces to 10% at 280 mL/min. The longer residence time allowed the feed to absorb greater microwave energy that enhanced the vaporization of the water molecules in the feed solution. On the other hand, at a higher feed flow rate, the enhancement in the presence of microwave irradiation decreased.

Microwave thermal effect compensates temperature decrease. In membrane distillation, temperature polarization is an important consideration. Microwave irradiation can provide a localized superheating which can not only compensate for temperature polarization, but also provide a higher vapor pressure gradient compared to what can be achieved via conventional heating. For MD, the molecule concentration in the membrane pores is very low, and the transfer velocity of the molecule is very high.

Figure 6:
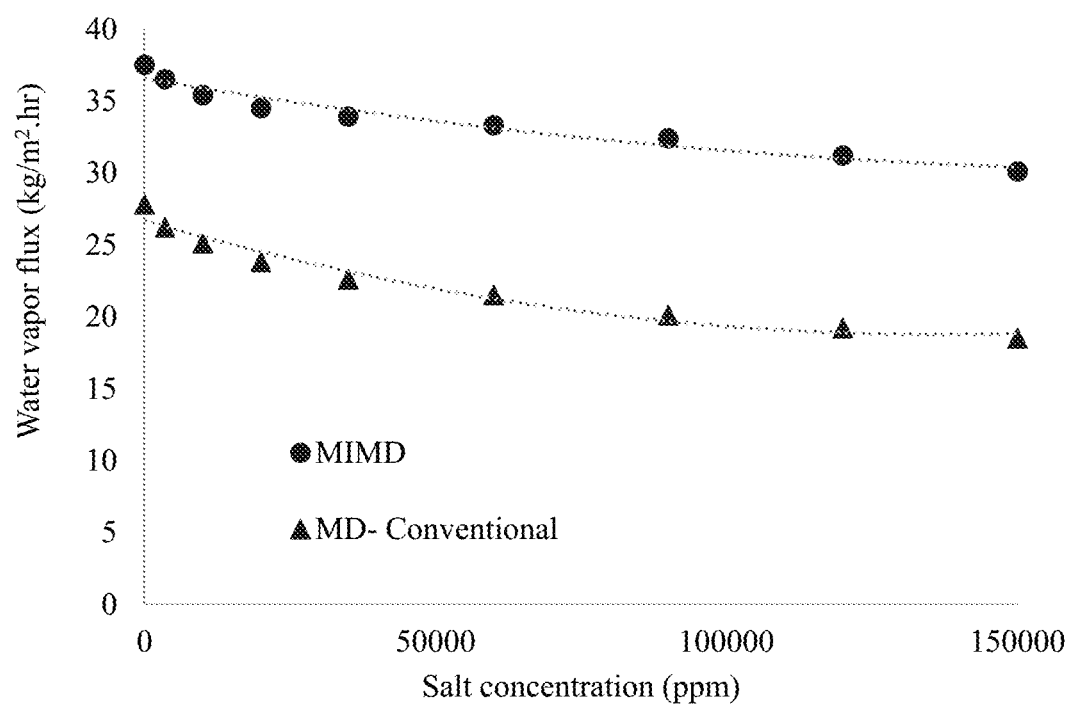
FIG. 6 is a graphical depiction of water vapor flux as a function of salt concentration in conventional membrane distillation and microwave induced membrane distillation in accordance with one or more embodiments of the present disclosure.

The effect of salt concentration on water vapor flux for a PTFE membrane is shown in FIG. 6. The presence of salt decreases the vapor pressure gradient, hence the water vapor flux. However, it is evident from FIG. 6 that the effect of salt concentration has less impact on the microwave induced MD process. For example, the decrease in water vapor flux for MIMD at 150000 ppm compared to pure water was about 20%, whereas in the conventional heating system the flux decreased by about 33.5%. The absorbed microwave energy in the brine increased the activity of water molecules. As a result of this agitation, the concentration as well as temperature polarization at the membrane interface and the bulk solution reduces significantly, which helps to enhance water vapor flux at very high salt concentration. The variation in the degree of acceleration due to differentiation in size of the ions induces randomization of water molecules in terms of position and orientations, and thus weakening of the water network, which reduces the concentration and temperature polarization arising at high salt concentration of saline water. See, M. Tanaka and M. Sato, Microwave heating of water, ice, and saline solution: Molecular dynamics study, Jr. Chem. Phys. 126 (2007) 034509.

The utilization of radiation enhanced desalination could be applied to any other membrane distillation processes, such as reverse osmosis, forward osmosis, pervaporation, nanofiltration, etc. Alternately magnetic fields or ultrasound may also be used to destabilize salt water clusters.

Microwave is being utilized to carry out various chemical reactions increasingly in the research and development laboratory. The use of microwave energy reports several prospective benefits over conventional chemistry, which can lead to decreases in the operating costs and open windows for more green processes. Another major benefit of using microwave includes a significant reduction in power consumption. For example, the power consumption for MIMD at 50° C. and 200 mL/min feed flow rate was observed as 0.65 kWh, whereas, under conventional heating system conditions, the power consumption was 0.84 kWh, which is 29.2% higher.

The long term stability of the membrane was studied thoroughly under microwave conditions for 30 days (8 hours per day) with 10000 ppm NaCl salt solution at 50° C. The water vapor flux and salt concentration at permeate side were measured periodically. The membrane was also cleaned with plain water each day for 10 minutes after completion of the experiment to remove any salt deposited on the membrane, which helped to regain its original performance. It was observed that there was no significant change in water vapor flux and salt rejection for the membrane. The membrane also did not show any physical damage due to the application of microwave energy.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

All references are incorporated by reference in their entirety.

REFERENCES

[1] H. J. Hwang, K. He, S. Gray, J. H. Zhang, I. S. Moon, Direct contact membrane distillation (DCMD): experimental study on the commercial PTFE membrane and modeling, J. Membr. Sci., 371 (2011) 90-98.

[2] J. Phattaranawik, R. Jiraratananon, A. G. Fane, C. Halim, Mass flux enhancement using spacer filled channels in direct contact membrane distillation, J. Membr. Sci. 187 (2001) 193-201.

[3] M. M. Teoh, S. Bonyadi, T.-S. Chung, Investigation of different hollow fiber module designs for flux enhancement in the membrane distillation process, J. Membr. Sci. 311 (2008) 371-379.

[4] C. Zhu, G. L. Liu, Modeling of ultrasonic enhancement on membrane distillation, J. Membr. Sci. 176 (2000) 31-41.

[5] D. Hou, Z. Wang, G. Li, H. Fan, J. Wang, H. Huang, Ultrasonic assisted direct contact membrane distillation hybrid process for membrane scaling mitigation, Desalination 375 (2015) 33-39.

[6] J. Wang, X. Sun, Y. Yuan, H. Chen, H. Wang, D. Hou, A novel microwave assisted photo-catalytic membrane distillation process for treating the organic wastewater containing inorganic ions, J. Water Process Engg., 9 (2016) 1-8.

[7] R. N. Gedye, W. Rank, K. C. Westaway, The rapid synthesis of organic-compounds in microwave-ovens. 2, Can. J. Chem. Rev. Can. Chim. 69 (1991) 706-711.

[8] Y. Wang, Z. Iqbal, S. Mitra, Microwave-induced rapid chemical functionalization of single-walled carbon nanotubes, Carbon 43 (2005) 1015-1020.

[9] J. Hong, N. Ta, S. G. Yang, Y. Z. Liu, C. Sun, Microwave-assisted direct photolysis of bromophenol blue using electrodeless discharge lamps, Desalination 214 (2007) 62-69.

[10] Y. Nakai, H. Yoshimizu, Y. Tsujita, Enhanced gas permeability of cellulose acetate membranes under microwave irradiation, J. Membr. Sci. 256 (2005) 72-77.

[11] S. M. Ibrahim, H. Nagasawa, M. Kanezashi, T. Tsuru, Robust organosilica membranes for high temperature reverse osmosis (RO) application: Membrane preparation, separation characteristics of solutes and membrane regeneration, J. Membr. Sci. 493 (2015) 515-523.

[12] R. Kreiter, D. P. Wolfs, C. W. R. Engelen, H. M. van Veen, J. F. Vente, High-temperature pervaporation performance of ceramic-supported polyimide membranes in the dehydration of alcohols. J. Membr. Sci. 319 (2008) 126-132.

[13] A. H. Hawaria, N. Kamala, A. Altaee, Combined influence of temperature and flow rate of feeds on the performance of forward osmosis. Desalination, 398 (2016) 98-105.

[14] W. Puthai, M. Kanezashi, H. Nagasawa, T. Tsuru, Nanofiltration performance of SiO2-ZrO2 membranes in aqueous solutions at high temperatures. Sep. and Purif. Technol, 168 (2016) 238-247.

[15] S. Mitra, S. Roy, M. Bhadra, Nanocarbon immobilized membranes, U.S. patent application Ser. No. 14/506,995, 2014.

[16] E. S. Kryachko, Ab initio studies of the conformations of water hexamer: modelling the penta-coordinated hydrogen-bonded pattern in liquid water, Chem. Phys. Lett. 314 (1999) 353-363.

[17] M. L. Rao, S. R. Sedlmayr, R. Roy and J. Kanzius, Polarized microwave and RF radiation effects on the structure and stability of liquid water, Curr. Sci. 98 (2010) 5.

[18] M. Tanaka and M. Sato, Microwave heating of water, ice, and saline solution: Molecular dynamics study, Jr. Chem. Phys. 126 (2007) 034509.

What is claimed is:

1. A membrane distillation (MD) system comprising an MD desalination system comprising:
  a feed media source comprising salt water;
  a permeate-side cooling media source;
  at least one MD module, the MD module comprising:
    at least one membrane,
    a feed inlet operable to receive the feed media,
    a feed outlet,
    a permeate-side cooling media inlet, and
    a distillate outlet;
  a radiative energy source operable to apply radiation to the feed media prior to the feed media entering the feed inlet, wherein the radiative energy source is a microwave generator; and
  a temperature controlled bath coupled to the at least one MD module to receive a reject stream from the feed outlet and to recirculate the reject stream with the feed media.

2. The MD system of claim 1, wherein the at least one MD module is selected from the group consisting of a hollow fiber membrane module, a flat membrane module and a spiral wound membrane module.

3. The MD system of claim 1 wherein the at least one MD module is selected from the group consisting of a direct contact membrane distillation (DCMD) module, a sweep gas membrane distillation (SGMD) module, a vacuum membrane distillation (VMD) module and an air gap membrane distillation (AGMD) module.

4. A method for purifying a feed media with a membrane distillation (MD) system comprising an MD desalination system including at least one MD module, the method comprising:
  supplying the feed media comprising salt water from a feed media source to a feed inlet of the MD module,
  supplying a permeate-cooling media from a permeate-side cooling media source to a permeate-side cooling media inlet of the MD module;
  subjecting the feed media to microwave radiation prior to the feed media entering the feed inlet;
  recovering a reject stream from a feed outlet of the in a temperature controlled bath coupled to the MD module, and recirculating the reject stream with the feed media.

5. The method according to claim 4 wherein the MD module comprises: a polymeric, ceramic, hydrophilic, hydrophobic, mixed matrix, porous, nonporous, or composite membrane.

6. The method of claim 4 comprising introducing make up water to the temperature controlled bath.

7. The method of claim 4 further comprising heating the feed media to a temperature in a range of 50° C. to 80° C.

8. The method of claim 4, wherein the feed media comprises seawater.

9. The MD system of claim 1, wherein the feed media comprises seawater and the MD module is effective for desalination of seawater.

* * * * *